United States Patent
Barro

[11] Patent Number: 5,704,525
[45] Date of Patent: Jan. 6, 1998

[54] BICYCLE FLASK HOLDER

[75] Inventor: Giovanni Barro, Conegliano, Italy

[73] Assignee: F. Lli Barro Giovanni & Luigi S.r. L., Conegliano, Italy

[21] Appl. No.: 654,115

[22] Filed: May 28, 1996

[30] Foreign Application Priority Data

May 25, 1995 [IT] Italy ................... PN95A0027

[51] Int. Cl.$^6$ ....................................... B62J 11/00
[52] U.S. Cl. .................. 224/414; 224/446; 224/462; 224/926; D12/411
[58] Field of Search .................. 224/414, 461, 224/462, 441, 443, 446, 433, 434, 926; 248/311.2, 313, 316.5, 316.7; D12/411, 419, 420

[56] References Cited

U.S. PATENT DOCUMENTS

| D. 264,954 | 6/1982 | Blackburn | D12/411 |
| 1,552,583 | 9/1925 | Stokes et al. | 248/316.5 |
| 2,724,798 | 11/1955 | Hare et al. | 248/311.2 |
| 2,761,644 | 9/1956 | Capocci | 248/316.5 |
| 3,193,232 | 7/1965 | Hatcher | 248/311.2 |
| 3,317,171 | 5/1967 | Kramer | 248/311.2 |
| 4,830,240 | 5/1989 | Tackles | 224/414 |
| 5,149,032 | 9/1992 | Jones et al. | 248/313 |

FOREIGN PATENT DOCUMENTS

| 1090061 | 3/1955 | France | 224/39 |
| 1130931 | 2/1957 | France | 224/38 |
| 493443 | 4/1954 | Italy | 224/30 R |
| 118510 | 4/1947 | Sweden | 224/37 |
| 399630 | 10/1933 | United Kingdom | 224/38 |
| 613242 | 11/1948 | United Kingdom | 224/39 |
| 805454 | 8/1956 | United Kingdom | 224/32 A |

*Primary Examiner*—Henry J. Recla
*Assistant Examiner*—Gregory M. Vidovich
*Attorney, Agent, or Firm*—Wenderoth, Lind & Ponack

[57] ABSTRACT

A flask holder for bicycles having a shape and dimensions equivalent to known flask type holders which, with respect thereto, is constituted by a first part (2) formed by a length of metal rod bent in a U shape, and two longitudinal tracks (21) which are parallel, between which a plate (24) is welded for fixture to the bicycle and a second part (3), also made of a metal rod bent such as to form an arced track (31), from ends of which two longitudinal tracks depart perpendicularly. The lower ends of the longitudinal tracks (21, 32), respective of the first part (2) and the second part (3), are interconnected by a special elastic element (4) such as a helix spring (41) or the like. The second part (3) can be spread for inserting and/or removing a flask which, when inserted, is gripped by the second part (3) which is biased against the flask by elastic element (4).

4 Claims, 1 Drawing Sheet

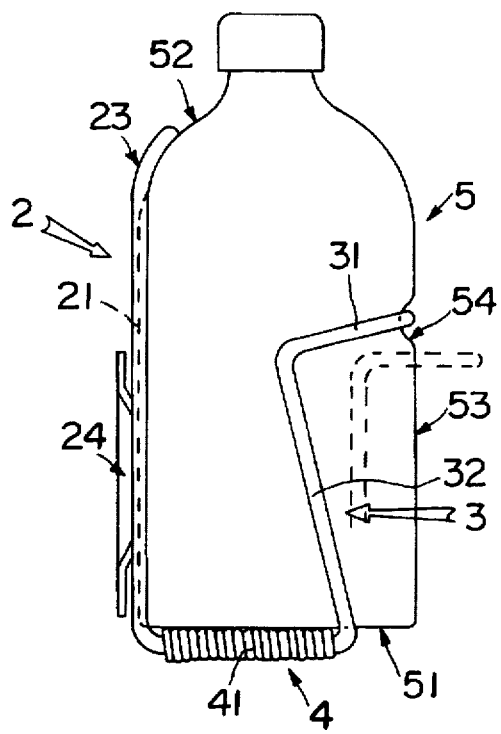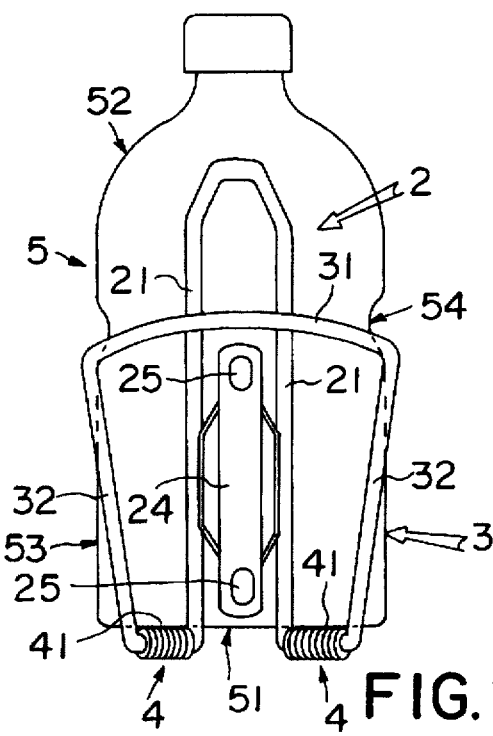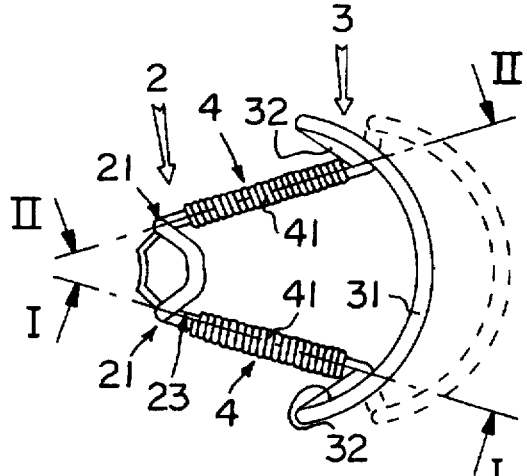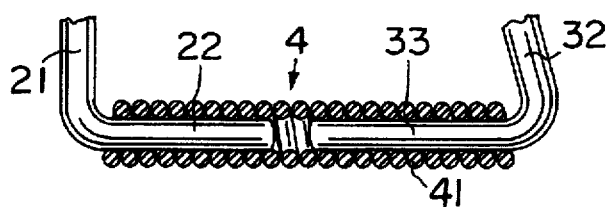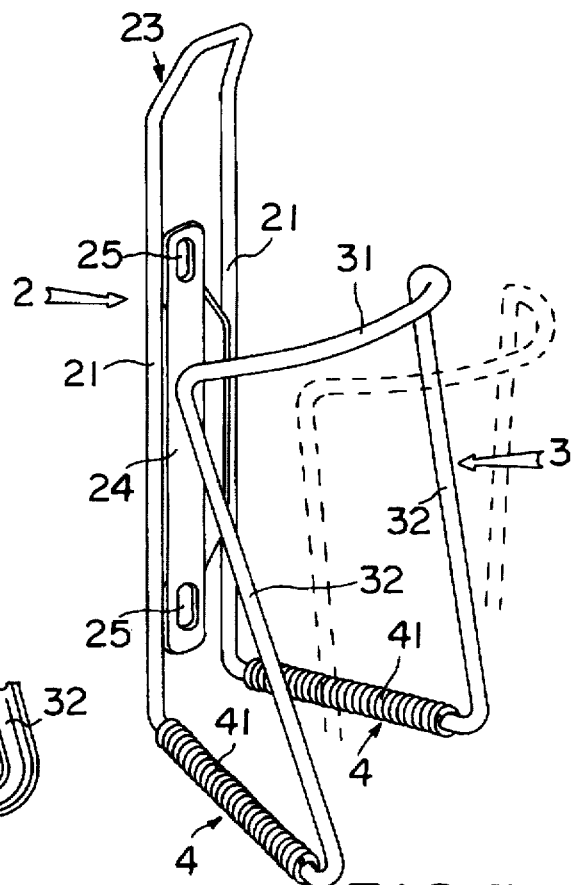

BICYCLE FLASK HOLDER

BACKGROUND OF THE INVENTION

The invention relates to a flask holder for bicycles comprising an independently mobile part for elastically gripping the flask.

In the sport or pastime of cycling, accessories called flask holders are well known and are normally constituted by a simple structure made with a special metal rod bent to form a basket shape and fixable to the frame of a bicycle, and in which a container for water or other drinks, known as a flask, can be inserted and removed from the holder when needed.

Types of flasks normally used are practically all of a same type and are constituted by a cylindrical spout provided at one end with a special cap, and are provided along a cylindrical part with a circumferential hollow.

Consequently, the most widely used flask holders are practically universally shaped, all presenting dimensions and conformations which are equivalent and more or less alike.

The basket of a common flask carrier is constituted by a structure formed by a rod, usually made of aluminum or suitable steel and in some cases, more recently, of titanium, conformed such as to form two first tracks of a predetermined length which are parallel and between which a plate is fixed, the plate having holes for mounting the basket to the structure of the bicycle frame. The rods are bent at their bottom ends perpendicularly in opposite directions to the first two tracks in such a way as to form two second tracks, which at their respective ends are further bent such as to form two third tracks which are slightly spread apart and spaced upwards, as well as somewhat inclined towards the first parallel tracks, and are finally bent at their upper ends in such a way as to connect to a fourth arced track curved outward and exhibiting an angle of curvature which corresponds to about the diameter of the cylindrical part of the flask. The two first parallel tracks also terminate at their upper ends, forming short tracks bent towards the opposite side of the fixture and being connected by a transverse track.

The above-described structure forms a basket in which the flask can be inserted. The bottom of the flask will rest on the second horizontal tracks and at its cylindrical body against the first vertical tracks. The fourth arced track penetrates into the circumferential hollow of the flask, while the upper part of said first vertical tracks, being bent in an opposite direction to the fixture, engages on a corresponding arced part of the upper end of the flask.

This structure is clearly considerably rigid, for which reason the insertion as well as the removal therefrom of the flask is accomplished by exploiting the elasticity of the flask shell.

It follows that if the arced track which penetrates into the circumferential hollow of the flask is too close to the counterposed vertical tracks, the insertion and removal of the flask then requires considerable force on the part of the rider.

If the arced track is too distanced from the vertical tracks, the flask will not sufficiently be held against the flask holder.

To obviate the above-mentioned drawbacks deriving from an excessive or insufficient grip on the flask, the user normally acts on the flask carrier structure itself, in that the user may deform the flask to adjust the curved track to obtain a sufficiently functional positioning of the flask.

Clearly, such interventions are irrational and in the long run can lead to further drawbacks.

The main aim of the present invention is to obviate the functional drawbacks and limitations in the prior art, and to provide an improved flask holder.

SUMMARY OF THE INVENTION

A flask holder for bicycles having independently mobile parts for elastically gripping a flask is provided. The flask holder includes a first part adapted for attachment to a bicycle frame, and a second part distanced from the first part in such a manner as to form a basket for containing the cylindrical flask. The first part is formed from a metal rod having two longitudinal tracks where the tracks connect at an upper end thereof. A plate is coupled between the longitudinal tracks where the plate is used to affix the flask holder to a bicycle frame. The second part of the flask holder is also formed of a metal rod, and has two longitudinal tracks where the tracks are connected by a third arced track at its upper end thereof. The first and second parts are interconnected at respective lower ends by short tracks which extend perpendicularly and transversely from one another, and where each of the short tracks includes a free end. An elastic element is also provided which interconnects the respective free ends to allow a flexing movement of the second part with respect to the first part.

BRIEF DESCRIPTION OF THE DRAWINGS

An improved flask holder is illustrated in the accompanying figures of the drawings purely by way of non-limiting example, and in which:

FIG. 1 is a lateral view of a flask carrier according to the invention;

FIG. 2 is the same flask carrier in frontal view;

FIG. 3 is a plan view of FIG. 1;

FIGS. 4A and 4B are enlarged views of a detail of the flask carrier, sectioned along lines I—I and II—II of FIG. 3; and FIG. 5 shows the same flask carrier in perspective view.

In the figures, details are denoted by the same references with bold continuous lines denoting the structure of the flask holder of the invention and slim continuous lines denoting the body of the flask arranged therein.

DESCRIPTION OF THE PREFERRED EMBODIMENT

With reference to FIGS. 1, 2, 3 and 5, the flask holder in this embodiment is fundamentally constituted by a structure in which the conformation and dimensions are all similar to those characterizing a typical flask holder.

This structure, in common with those of known type, is fashioned from a metal rod bent appropriately, which, instead of forming a single element, forms two distinct parts, a first fixed part 2 which can be fixed in a known way to the structure of a bicycle, and a second mobile part 3 which is connected to the fixed part 2 by elastic element 4.

The first fixed part 2 is made, like the mounted part of known structures, of a metal rod bent in the shape of a U such as to form two first longitudinal tracks 21 reciprocally parallel and near to one another, which at their lower ends are bent perpendicularly in opposite direction to the first fixed part, forming two second short tracks 22 having free ends and symmetrically spread apart. A short part 23 of the upper end of the first longitudinal tracks 21 is bent in an opposite direction to the first fixed part.

Between the first longitudinal tracks 21, a plate 24 is welded; plate 24 is provided with a pair of holes 25 and is specially shaped as to permit a traditional type fixture of the flask holder structure on a corresponding part of the bicycle frame.

The length of the first longitudinal tracks 21 is such as to allow the flask 5 to rest on its bottom 51 on the elastic element 4, as applied on the second short tracks 22. The corresponding arced surface 52 of the flask's upper end abuts against the relative short part 23 of the upper end of the first longitudinal tracks 21, as well as the cylindrical part 53 of the flask.

The second mobile part 3 is also constituted by a metal rod, the same as that used to form the first fixed part 2, which is bent such as to form an arced track 31 which extends over a semicircular track with an angle of curvature which corresponds to the external diameter of the cylindrical part 53 of the flask 5. The ends of the arced track 31 extend perpendicularly into two slightly converging longitudinal tracks 32 that are further bent at opposite ends in an opposite direction to that of the arced track 31 and define two short tracks 33 having free ends (see FIG. 4). The two short tracks 33 are formed at the end of the relative longitudinal tracks 32 from which they extend at an acute angle of about 75°. The short tracks 33 are reciprocally convergent in that, after application of the elastic element 4, they are coaxial to the second short tracks 2 of the first fixed part 2.

The longitudinal tracks 32 extend over a certain length such that the external end of the arced track 31 coincides with the bottom of a circumferential hollow 54 on the cylindrical part 53 of the flask 5.

Worthy of note is the fact that the length of the second short tracks 22 of the first fixed part 2 and the short tracks 33 of the second mobile part 3 is about the same or is preferably less than the length of the corresponding tracks of the traditional structures on which the bottom of the flask 5 rests.

In the embodiment which is the object of the present invention, on each of the second short tracks 22 of the first fixed part 2 and on the corresponding short tracks 33 of the mobile part 3, a special elastic element is inserted, as can be seen in FIG. 4A, which, in the preferred embodiment to which reference is herein made, is constituted by a helix spring 41 which is fixed on the short tracks 33 in a known way and with suitable known means.

Obviously, the elastic element 4 can also be constituted by tubular sleeves made of suitable elastomer materials 42, such as rubber or the like, or by other kinds of metal springs such as elastic metal plates welded to the lower ends of the longitudinal elements 32 of the second part 3, or by other flexible elements able to perform the same function.

From the preferred embodiment, it is evident that the mobile part 3 of the new structure as above described can be easily bent outward, as is clearly indicated in FIGS. 1, 3 and 5 by the broken line, such that the introduction and/or removal of the flask is considerably facilitated. Furthermore, the flask's return into the internal position is securely held due to the force generated by the elastic element 4.

The aforementioned evidences the simplicity of the described invention, which surely and reliably eliminates all the drawbacks of the known equivalent flask holders.

Various embodiments of the object of the invention might be proposed without forsaking the field described and claimed, and therefore without removing the object of the invention from the ambit of protection claimed.

Obvious constructional variants can be applied to the flask holder without forsaking the ambit of the aforementioned and hereinafter claimed flask holder.

I claim:

1. A flask holder for bicycles comprising:

a first part adapted for attachment to a bicycle frame;

a second part distanced from said first part in such a manner as to form a basket for containing a substantially cylindrical flask;

said first part being formed of a metal rod having two longitudinal tracks, said longitudinal tracks being connected at an upper end thereof;

a plate coupled to said longitudinal tracks for fixture to the bicycle frame;

said second part being formed of a metal rod having two longitudinal tracks, said longitudinal tracks of said second part being connected by an arced track;

said first and second parts being interconnected at respective lower ends by respective short tracks extending transversely from each of said longitudinal tracks, wherein each of said short tracks includes a free end;

an elastic element interconnecting said respective free ends to allow flexing movement of said second part with respect to said first part; and wherein said elastic element includes a length of tubular sleeve made of elastomer material coupled to said free ends of said short tracks.

2. A flask holder for bicycles comprising:

a first part adapted for attachment to a bicycle frame;

a second part distanced from said first part in such a manner as to form a basket for containing a substantially cylindrical flask;

said first part being formed of a metal rod having two longitudinal tracks, said longitudinal tracks being connected at an upper end thereof;

a plate coupled to said longitudinal tracks for fixture to the bicycle frame;

said second part being formed of a metal rod having two longitudinal tracks, said longitudinal tracks of said second part being connected by an arced track;

said first and second parts being interconnected at respective lower ends by respective short tracks extending transversely from each of said longitudinal tracks, wherein each of said short tracks includes a free end;

an elastic element interconnecting said respective free ends to allow flexing movement of said second part with respect to said first part; and wherein said elastic element includes a length of tubular sleeve made of rubber coupled to said free ends of said short tracks.

3. A flask holder for bicycles comprising:

a first part adapted for fixture thereof to a frame of a bicycle;

a second part distanced from said first part, wherein said first and second parts form a basket for containing a substantially cylindrical flask;

said first part and said second part being formed of metal rods;

said first part having two longitudinal parallel tracks forming a U shape having a short track transverse to and relatively short, as compared with said two longitudinal parallel tracks, at an upper end thereof and bent toward said second part;

a plate welded between said two longitudinal parallel tracks adapted for fixture to the frame of the bicycle;

said second part comprising an arched track at an upper end thereof extending semi-circularly with a degree of curvature corresponding to an external diameter of the flask, and having two longitudinal tracks extending perpendicularly from ends of said arched track, wherein said two longitudinal tracks of said second part converge toward each other;

said second part including connection tracks at a lower end thereof;

said first part including connection tracks at a lower end thereof which extend perpendicularly from said two longitudinal parallel tracks and diverge away from each other outwardly toward said connection tracks of said second part;

said connection tracks of said second part forming an acute angle of about 75 degrees with said lower end of said second part;

said connection tracks of said first part being connected by elastic elements to said connection tracks of said second part so as to permit a deformability of said flask holder, wherein said second part can be spread apart from said first part to allow insertion and removal of the flask from said flask holder; and wherein said elastic elements generate an elastic force which biases said second part toward said first part when said second part is spread apart from said first part.

4. A flask holder, as claimed in 3, wherein said elastic elements are helix springs, wherein said helix springs engage ends of said connection tracks of said first part which extend perpendicularly from said two longitudinal parallel tracks of said first part, and wherein said helix springs engage ends of said connection tracks of said second part which extend from said two longitudinal tracks of said second part;

said connection tracks of said second part being coaxial to said connection tracks of said first part; and said helix springs being affixed to said connection tracks of said first and second parts.

* * * * *